United States Patent [19]

Takahashi

[11] Patent Number: 5,067,029
[45] Date of Patent: Nov. 19, 1991

[54] ELECTRONIC STILL CAMERA CAPABLE OF SELECTING RECORDING MEDIA

[75] Inventor: Yohnosuke Takahashi, Shizuoka, Japan

[73] Assignee: Fuji Photo Film Co., Ltd., Kanagawa, Japan

[21] Appl. No.: 333,914

[22] Filed: Apr. 6, 1989

[30] Foreign Application Priority Data

Apr. 8, 1988 [JP] Japan .................................. 63-85120

[51] Int. Cl.$^5$ ............................................ H04N 5/225
[52] U.S. Cl. .................................... 358/909; 358/906; 358/335; 358/310; 358/209
[58] Field of Search ............... 358/310, 335, 906, 909, 358/342; 360/33.1, 35.1, 14.1

[56] References Cited

U.S. PATENT DOCUMENTS

| | | | |
|---|---|---|---|
| 4,131,919 | 12/1978 | Lloyd et al. | 358/906 |
| 4,189,744 | 2/1980 | Stern | 358/310 |
| 4,456,931 | 6/1984 | Toyoda et al. | 358/335 |
| 4,489,351 | 12/1984 | d'Alayer de Costemore d'Arc | 358/906 |
| 4,520,401 | 5/1988 | Takahashi et al. | 358/310 |
| 4,584,598 | 4/1986 | Kutaragi | 360/35.1 |
| 4,592,041 | 5/1986 | Senzaki et al. | 369/126 |
| 4,691,253 | 9/1987 | Silver | 360/35.1 |
| 4,845,571 | 7/1989 | Hirano et al. | 358/342 |

OTHER PUBLICATIONS

Tanaka et al., *An Electronic Still Camera System*, 06/09/1986, pp. 345-354.

*Primary Examiner*—Roy N. Envall, Jr.
*Assistant Examiner*—Thai Tran

[57] ABSTRACT

An electronic still camera in which as a recording medium, for example, at least either one of a semiconductor memory, an optical memory, and a magnetic memory is selected so as to record a video signal therein. Through the selection of the recording medium, it is possible to desirably set the recording speed and the recording capacity.

8 Claims, 8 Drawing Sheets

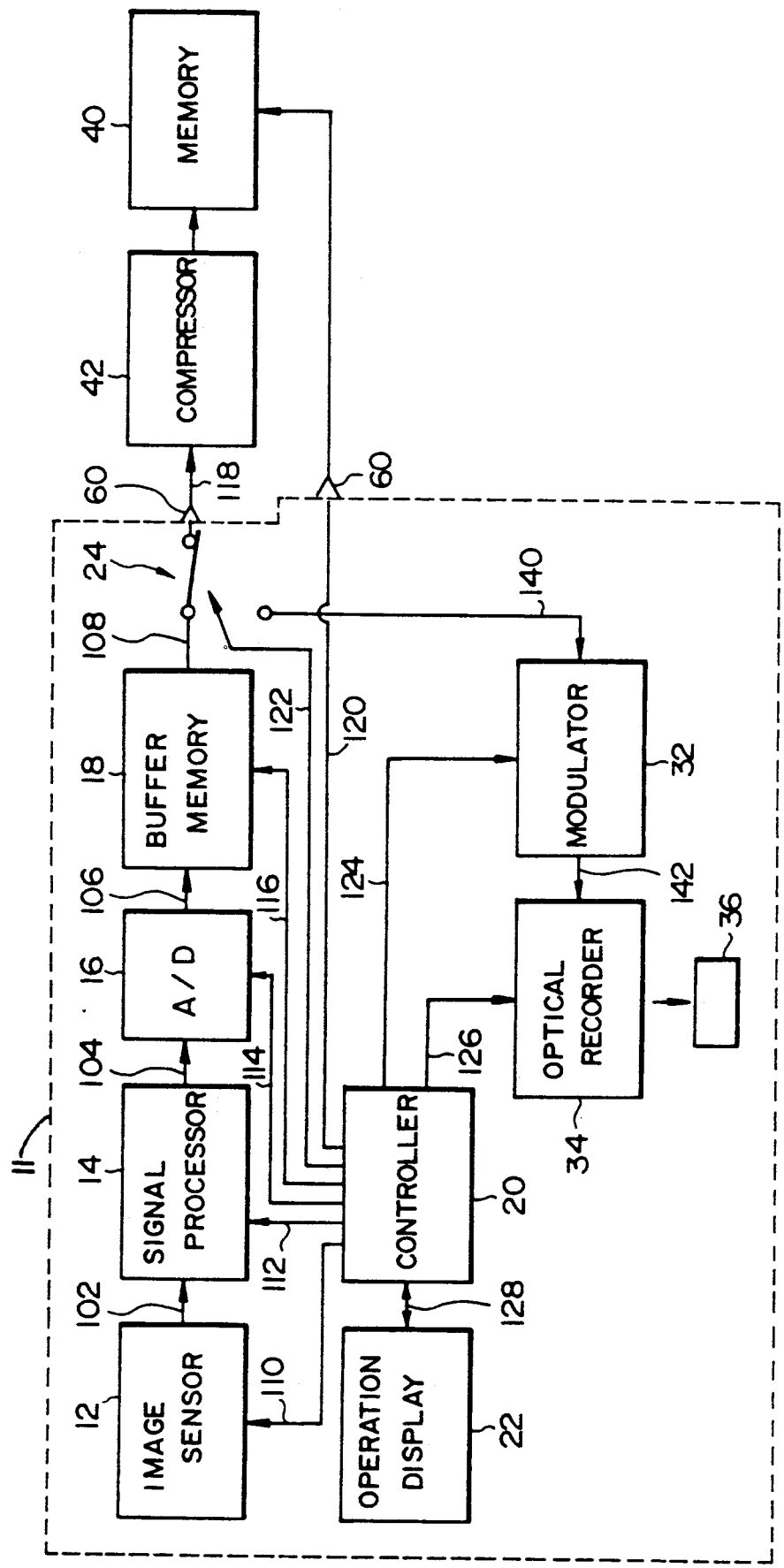

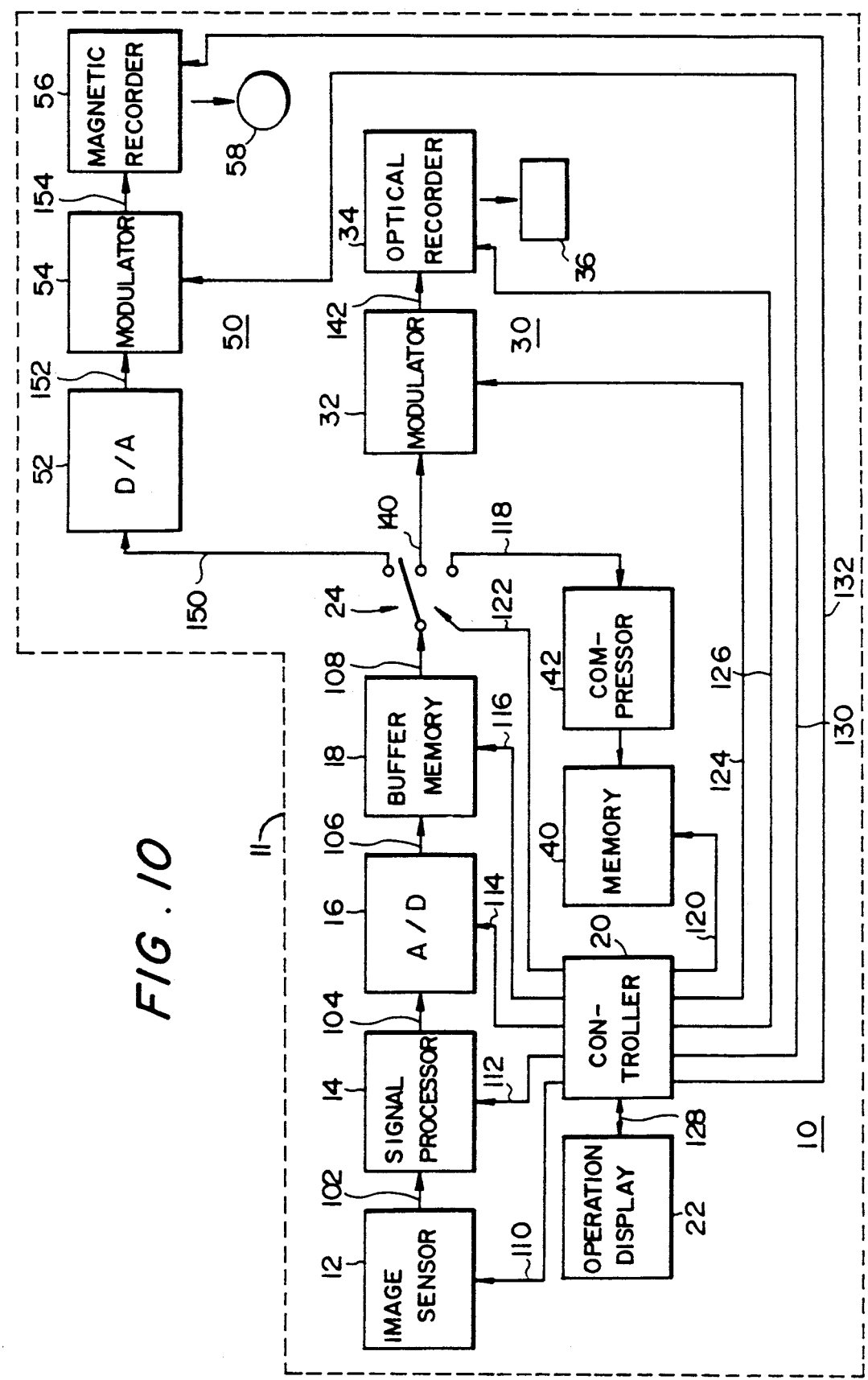

ELECTRONIC STILL CAMERA CAPABLE OF SELECTING RECORDING MEDIA

BACKGROUND OF THE INVENTION

1. Field of the Invention

The present invention relates to an electronic still camera, and in particular, to an electronic still camera capable of selecting recording media on which still pictures are to be recorded.

2. Description of the Related Art

Conventionally, there has been known an electronic still camera in which an object field is shot by use of a solid-state imaging device so as to record signals of the still image picture on a recording medium such as a magnetic disk. As the recording medium of such an electronic still camera a semiconductor memory device is empolyed, for example.

Since a high-speed write operation is possible by use of a semiconductor memory device, an operation to record an image thus shot on the storage can be accomplished in a short period of time. In consequence, the recording operation is applicable to pictures sequentially shot at a high speed. However, because the semiconductor memory device does not have a sufficient storage capacity and is expensive, there arises in some cases a problem that the storage capacity is too small to record a great number of pictures. In addition, the semiconductor memory device is subject to an influence from static electricity and is hence possibly prevented from achieving the recording operation. Furthermore, in a case of an integrated-circuit, IC memory integrated in a camera, a backup power supply is necessary to keep therein the recorded contents, which leads to a problem that the IC memory cannot be separated from the camera for the preservation thereof.

In contrast, when other recording media such as those employed to record a picture according to an optical recording system and a magnetic recording scheme are used, the disadvantageous features above such as the insufficiency of the capacity are removed. However, the recording speed on the recording medium is less than that developed on the semiconductor memory device, and hence there exists a problem that it is impossible, for example, for a camera successively shooting pictures at a high speed to achieve the recording operation thereof on such recording media.

SUMMARY OF THE INVENTION

It is therefore an object of the present invention to provide an electronic still camera in which the write operation is possible at various kinds of speeds and recording media can be used to obtain a desired size of the recording capacity thereof. As a result, the problems of the related art may be eliminated.

According to the present invention, an electronic still camera in which an object field is shot so as to record a still picture thereof on a recording medium comprises imaging means for shooting an object field, signal store means capable of temporarily storing a video signal produced from said imaging means and capable of achieving read operations of the signals therefrom at different speeds, and output select means for delivering a video signal read from said signal store means to a plurality of recording media having respective recording speeds different. The output and select means selecting at least one of the recording media so as to feed the video signal read from said signal store means to the selected recording medium.

BRIEF DESCRIPTION OF THE DRAWINGS

The objects and features of the present invention will become more apparent from the consideration of the following detailed description taken in conjunction with the accompanying drawings in which:

FIGS. 6-10 are schematic block diagrams illustrating an alternative embodiment of an electronic still camera according to the present invention.

DESCRIPTION OF THE PREFERRED EMBODIMENTS

Referring now to the accompanying drawings, description will be given in detail of an embodiment of an electronic still camera according to the present invention.

Figure 1:
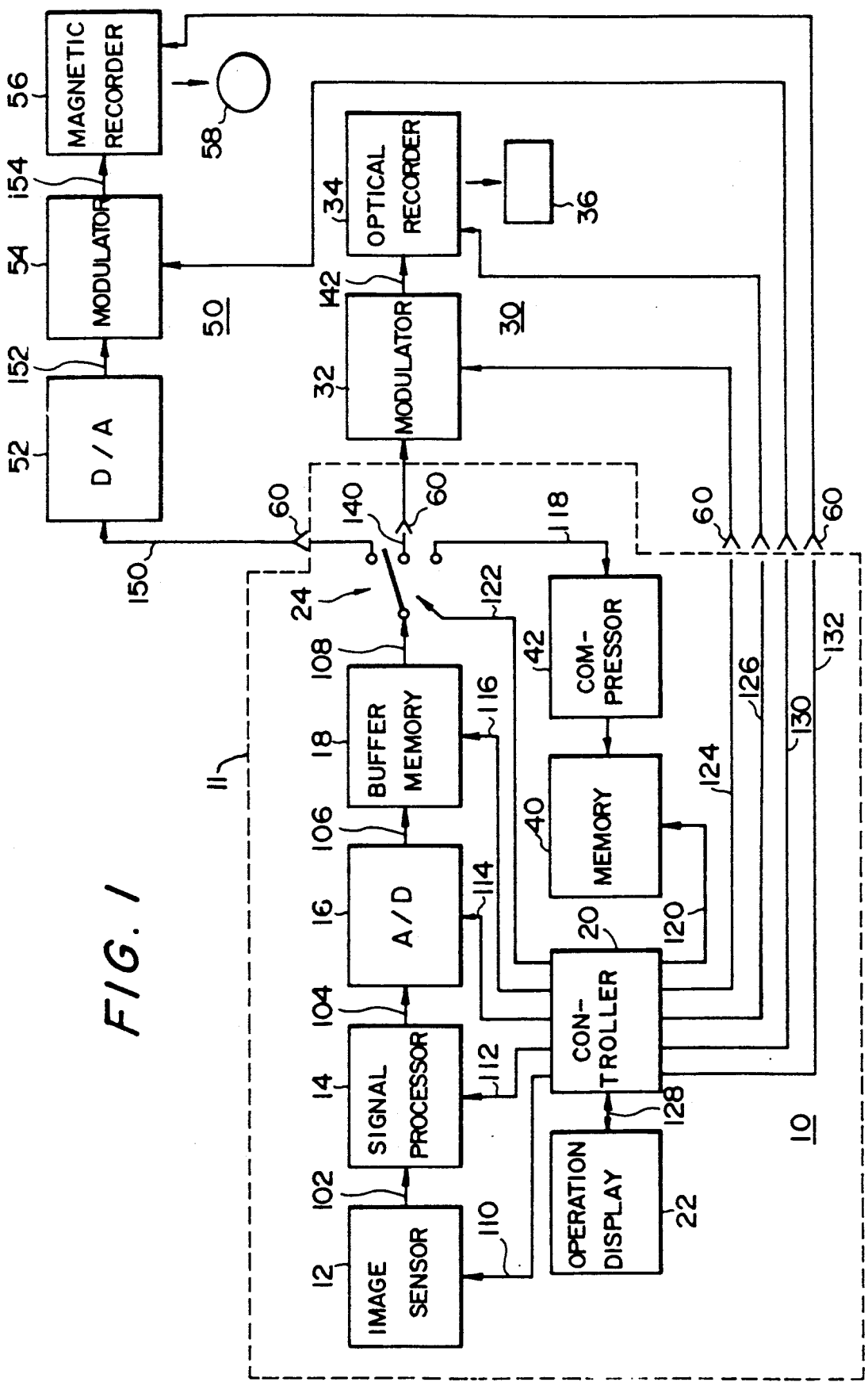
FIG. 1 is a schematic block diagram illustrating an embodiment of an electronic stil camera according to the present invention.

FIG. 1 illustrates an embodiment of an electronic still camera according to the present invention.

In this embodiment, there are disposed an optical recording unit 30 in which a still picture shot by an electronic still camera 10 is recorded on an optical card 36 and a magnetic recording unit 50 in which a recording operation is achieved on a magnetic disk 58 such that the optical recording unit 30 and the magnetic recording unit 50 are detachably linked to the electronic still camera 10. In this figure, the portion of components on the left side of the connector 60 is mounted as a digital electronic still camera in a single housing 21. On the other hand, the portion on the right side of the connector 60 is disposed as the magnetic recording unit 50 and the optical recording unit 30 in the respective separate housings.

The electronic still camera 10 includes an image sensor 12 to which a solid-state imaging device such as a charge-coupled device, a CCD or a metal-oxide semidonductor, (MOS) is advantageously applied. The image sensor 12 is operative in response to a control signal supplied from a control circuit 20 via a control line 110 so as to read out a video signal to an output 102 in synchronism with a synchronization signal fed from a synchronization circuit not shown, thereby delivering the output 102 as an input to a signal processor 14.

The signal processor 14 effects a sample and hold operation on a video signal associated with a filter array of the image sensor so as to achieve a color separation. Thereby a color component signal generate function is developed to produce color component signals R, G, and B respectively related to red, green, and blue and achieving a matrix function to create a luminance signal Y and color difference signals R-Y and B-Y from the color component signals R, G, and B. Furthermore, the signal processor 14 has a function to conduct necessary video signal processing such as a white balance adjustment and a gradation correction on the produced signals. The signal processor 14 delivers an output 104 to an analog-to-digital, (AD) converter 16.

The AD converter 16 is a signal converter, which converts the video signals in the analog format received from the input 104 thereof into digital signals so as to deliver the digital signals to an output 106 thereof, which is connected to a buffer memory 18. The buffer memory 18 is disposed to temporarily store therein the input 106 from the AD converter 16 and is capable of effecting a read operation at a high speed. From the buffer memory 18, the stored video signal is read out according to the respective recording speeds of a semiconductor memory 40, the magnetic disk 58, and the optical card 36, which will be described later.

The buffer memory 18 delivers an output 108 via a switch circuit 24 to a signal line 140, 150, or 118 in a selective fashion. The switch 24 develops a function to selectively connect the output from the buffer memory 18 to the signal line 140, 150, or 118 in response to a control signal supplied from a control circuit 20 via a control line 122. As a result, the output 108 from the buffer memory 18 is supplied via a compressor 42 to the memory 40 integrated in the electronic still camera 10 or via the connector 60 to a digital-to-analog converter 52 of the magnetic recorder 50 linked to the electronic still camera 10 or to a modulator 32 of the optical recorder 30.

The compressor 42 effects a compression of image data according to an orthogonal transform coding. That is, the image data are subdivided into a predetermined number of blocks so as to achieve a two-dimensional orthogonal transform. Thereafter, a Huffman coding is accomplished for compressing the image data.

The memory 40 is a semiconductor memory such as an IC memory, which is employed as a recording medium to record still pictures in cases where the pictures are recorded at a high speed like in a case of a successive high-speed shooting operation and where a small number of pictures are to be shot and hence a small memory capacity suffices.

The controller 20 is a control function section operative in response to an indication signal received from an operation display 22 via a signal line 128 for controlling the operations of the overall system. The control signals are supplied via the control line 110 to the image sensor 12, via a control line 112 to the signal processor 14, via a signal line 114 to the AD converter 16, via a control line 116 to the buffer memory 18, via a control line 120 to the memory 40, via a control line 122 to the switch 24, and via the control line 128 to the operation display 22, respectively. In addition, the controller 20 monitors the states of the respective components through these control lines.

Furthermore, the controller 20 delivers control signals via the signal lines 124, 126, 130, and 132 through the connector 60 to the modulator 32 and the optical recorder 34 of the optical recording section 30 and to the modulator 54 and the magnetic recorder 56 of the magnetic recording section 50, respectively.

The operation display 22 has various manual buttons such as a shutter release button, an exposure button, and a white balance adjust button for developing a function to input therefrom indications by the operator to the camera 10 so as to supply the indications via the signal line 128 to the controller 20 and for achieving a display function to receive a signal indicating a state of the system from the controller 20 so as to display the state for the operator. In this system, particularly, an indication of the store device selected by the operator, namely, the memory 40, the optical card 36, or the magnetic disk 58 is supplied so as to be fed to the controller 20.

To the electronic still camera 10, there is detachably connected the optical recorder 30 to achieve an optical recording of an image signal onto the optical card 36. The optical recording unit 30 includes the modulator 32, which receives as an input thereto a still image signal delivered from the buffer memory 18 of the electronic still camera 10 via the signal line 140 and the connector 60. The modulator 32 is operative in response to a control signal sent from the controller 20 of the electronic still camera 10 via the control line 124 and the connector 60 for modulating the received image signal for an optical recording operation, thereby supplying an output 142 to the optical recorder 34.

The optical recorder 34 is a recording section which optically records image data, for example, in an optical recording area of the optical card 36 and includes components such as a solid-state scanner.

Figure 2:
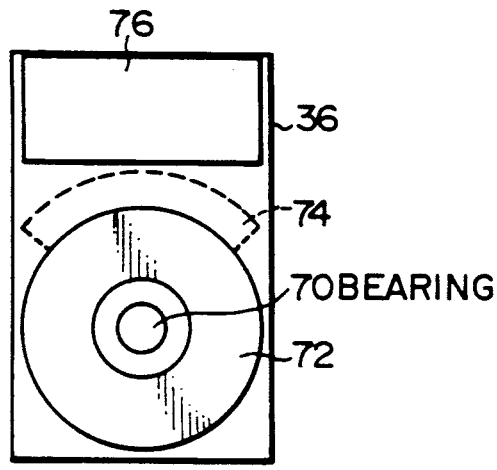
FIG. 2 is a diagram illustrating an example of an optical card on which an optical recording is effected by the apparatus of FIG. 1.

The optical card 36 is an image recording medium including on a surface thereof an optical recording area in which the reflection factor thereof varies depending on a radiation of a light. The optical card 36 may be of a type described in the Japanese Patent Laid-Open Publication No. 211124/1988 and, as illustrated in FIG. 2, includes a rotary shaft bearing 70 for a bearing hole at a position shifted from a center of the card 36 so as to allow rotations of the optical card 36. In the periphery of the bearing 70, there is disposed a ring-shaped recording area 72 having an outer periphery portion including a semi-circular recording area 74. The areas 72 and 74 are used to sequentially record therein data in a spiral fashion and are constituted with a recording layer formed with layers such as a photosensitive layer and a optically reflective layer and with a transparent protection layer formed thereon. The optical card 36 further incudes a visible recording area 76.

Figure 4:
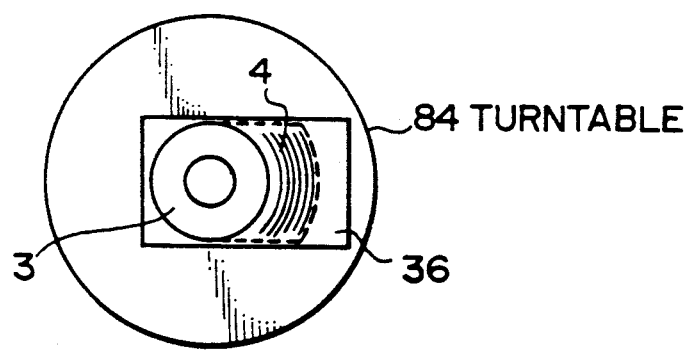
FIG. 4 is a plan view illustrating a rotary section of the optical recording section of FIG. 3.
Figure 5:
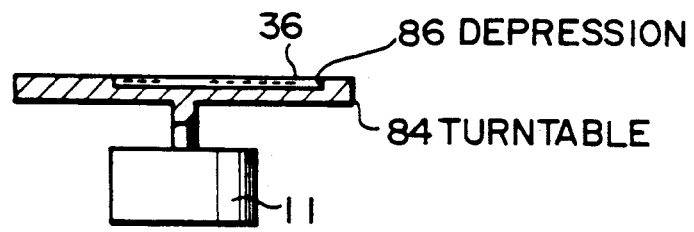
FIG. 5 is a side view illustrating the rotary section of the optical recording section of FIG. 3.
Figure 3:
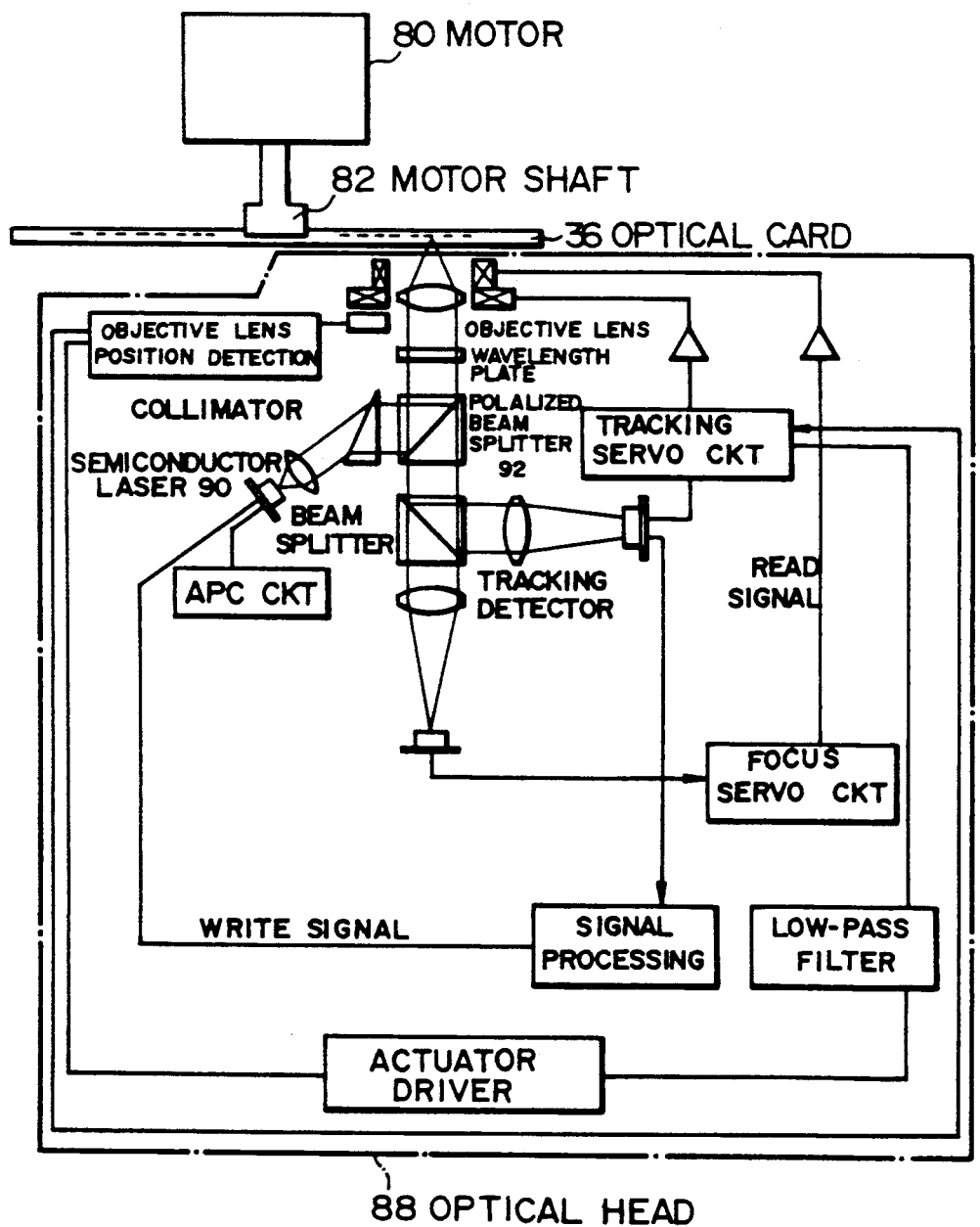
FIG. 3 is a diagram schematically illustrating an example of an optical recording section of the apparatus of FIG. 1.

FIG. 3 illustrates an example of the constitution of the optical recorder 34. The optical card 36 having a rectangular shape is fixed on a rotary shaft of a motor 80 by the rotary shaft bearing 70 so as to be rotated about the bearing 70 by the motor 80. For example, as illustrated in FIGS. 4-5, the card 36 is fixedly mounted on a turntable 84 fixed on a rotary shaft 82 of the motor 80. The turntable 84 includes a depression 86 having a shape similar to the shape of the card 36 such that the center of gravity of the mass including the turn table 84 and the card 36 mounted thereon is set to the rotary shaft 82 of the motor 80. With the provision of the turntable 84, a smooth rotation of the card 36 is developed regardless of the location where the rotary center of the card 36 is placed.

An optical head 88 disposed in the lower portion in this figure so as to oppose the recording areas 72 and 74 of the optical card 36 moves along a direct line over the radial lines including the center axis of the optical card 36 so as to sequentially write image information therein in a spiral shape at a timing synchronized with the rotation of the optical card 36. It is to be understood that the optical head 88 is also applied to a read operation of information written on the optical card 36.

As described above, by using the spiral recording method, the write operation of the sequential information items is accomplished by the rotation of the motor 80 and through a movement along a direct line of the optical head 88, which therefore enables the write operation to be effected at a relatively high speed.

In the optical recording unit 30, a still picture shot by the electronic still camera 10 is optically recorded in the optical recording area of the optical card 36.

That is, a signal modulated by the modulator 32 is supplied to a semiconductor laser 90 of the optical head 88, which in turn produces a light associated with the image signal. The light is subjected to a polarized scanning by a polarize device as a polarized beam splitter 92 and is then irradiated onto an optical recording area of the optical card 36, thereby accomplishing the optical recording operation.

Moreover, a magnetic recording unit 50 is detachably connected to the electronic still camera 10, the recording unit 50 effecting a magnetic recording of an image signal on a magnetic disk 58. The magnetic recording unit 50 includes a DA converter 52 and a modulator 54. The DA converter receives as an input thereto a still picture signal delivered from the buffer memory 18 of the electronic still camera 10 via the signal line 108 and the connector 60 so as to be converted into an analog signal for the magnetic recording thereof.

The modulator 54 achieves a frequency modulation on an image signal received from the DA converter 52 via an input 152 for the magnetic recording of the signal so as to deliver an output 154 to the magnetic recorder 56.

The magnetic recorder 56 writes image data on a predetermined track of the magnetic disk 58.

The operation of the electronic still camera 10 will now be described.

In a case where, as the recording medium for recording the obtained images, the optical card 36 and the magnetic disk 58 are employed together with the memory 40, the operator first connects the optical recording unit 30 and the magnetic recording unit 50 to the electronic still camera 10 by the connector 60.

When the operation display 22 is initiated to achieve a shooting operation of an object field, the image sensor 12 delivers a video signal to the signal processor 14, which conducts a signal processing such as a color separation so as to supply the output 104 to the AD converter 16. The signal received by the AD converter 16 is converted into a digital signal, which is then fed as the output 106 to the buffer memory 18. The signal is temporarily stored in the buffer memory 18 so as to be read out to the output 108 in response to a control signal from the controller 20.

In a case where successive pictures are recorded at a high speed or where the memory 40 has a capacity sufficient to store the obtained images, the operator supplies from the operation display 22 an indication for a selection of the memory 40. The controller 20, on receiving the indication signal from the operation display 22, delivers a control signal via the control line 122 to the switch circuit 24, which is connected to a terminal such that the output from the buffer memory 18 is fed to the compressor 42.

The signal stored in the buffer memory 18 is read therefrom in response to a control signal from the controller 20 so as to be supplied via the switch 24 to the compressor 42. The image signal received by the compressor 42 is then compressed through an orthogonal transform coding operation and is fed to the memory 40. As a result, the signal associated with the still picture thus shot is stored in the memory 40.

On the other hand, in a case of a slowspeed shooting operation or in a case where the capacity of the memory 40 is insufficient to store the obtained images, the operator inputs from the operation display section 22, for example, an indication to select as a recording medium the optical card 36 having the larger storage capacity. The controller 20 receives the indication signal from the operation display 22 and then produces a control signal to the switch 24, which in turn is connected to a terminal so as to input the output 108 from the memory buffer 18 via the connecotr 60 to the optical recording unit 30.

The signal stored in the buffer memory 18 is read therefrom in response to a control signal from the controller 20 so as to be fed via the switch 24 and the connector 60 to the modulator 32 of the optical recording unit 30. The signal received by the modulator 32 is modulated for the optical recording operation and is then delivered to the optical recorder 34, which accomplishes an optical recording of the received signal in the optical recording area of the optical card 36, as illustrated in FIG. 3.

Furthermore, in a case where the operator inputs from the operation disply 22 an indication to select the magnetic disk 58 as the recording medium. the controller 20 receives the indication signal from the operation display 22 so as to output a control signal via the control line 122 to the switch circuit 24, which is then connected to a terminal so as to supply the output 108 from the buffer memory 18 via the connector 60 to the magnetic recording unit 50.

In response to the operation above, the signal stored in the buffer memory 18 is read therefrom in response to a control signal from the controller 20 so as to be fed via the switch 24 and the connector 60 to the DA converter 52. The signal received by the DA converter 52 is converted into an analog signal and is then subjected to a frequency modulation by the modulator 54, thereby delivering the obtained signal to the magnetic recorder 56. The signal supplied to the magnetic recorder 56 is magnetically written on a predetermined track of the magnetic disk 58.

According to this embodiment, the operator can select as a recording medium either one of the semiconductor memory 40, the optical card 36, and the magnetic disk 58. In consequence, in a case where a large number of pictures are to be shot, the operator needs only to select as the recording medium the optical card 36 or the magnetic disk 58 having a great recording capacity to record the obtained pictures. On the other hand, for a small number of pictures to be shot, as the capacity of the memory 40 is sufficient for recording the pictures, the operator may select either one of the memory 40, the optical card 36, and the magnetic disk 58.

For a successive picture shooting at a high speed, it is only necessary to select the memory 40 to write the signal of the pictures at a high speed.

As described above, according to the present invention, for example, it is also possible to select both of the semiconductor memory 40 and the optical card 36 as the recording media of the obtained pictures.

In consequence, if the optical card 36 is selected for a great volume of signals of pictures to be recorded, the operator selects the optical card 36 to avoid an occurrence of a disadvantageous event in which the recording operation becomes impossible due to an insufficient capacity of the storage, which may take place in a case where only the semiconductor memory 40 is employed. In addition, when the optical card 36 is adopted as the recording medium, because the optical card 36 has a large recording capacity, the image data need not be compressed before the recording operation. For example, also in a case where image signals associated with the television system of a high picture quality are to be recorded, a satisfactorily great number of pictures can be recorded. In addition, compared with the case utilizing the semiconductor memory 40, the recording unit can be more simply configured and is hence advantageously applicable also to a handy camera. Moreover, in a case of an optical recording, the recording medium is not restricted by the optical card 36, for example, a film in a roll shape can be employed, which further increases the recording capacity. When a optical recording medium is adopted, a failure due to static electricity does not take place, which may occur in a case of the semiconductor memory 40. Moreover, there is not required a backup power supply. In addition, because of a low price of the recording medium, a disposable recording medium may be used.

On the other hand, in a case where the semiconductor memory 40 is selected, there does not occur a case where the recording operation becomes impossible due to an insufficient write speed, which may take place in the case of the optical card 36. In consequence, a high-speed recording can be achieved though a successive shooting operation at a high speed. Furthermore, when the semiconductor memory 40 is employed, the memory may be repeatedly used because erasure of the memory is easy.

According to this embodiment, because the optical recording unit 30 and the magnetic recording unit 50 are detachably connected to the camera 10, when the recording operation is not achieved on the optical card 36 nor on the magnetic disk 58, namely, when only the memory 40 is employed for the recording operation, the weight of the overall system of the camera 10 can be reduced by removing therefrom the optical recording unit 30 and the magnetic recording unit 50.

Incidentally, although the operator in this embodiment supplies the indication for a selection of the recording medium from the operation display 22, it may also possible for the controller to detect signals, for example, associated with a speed of a signal to be stored in the buffer memory 18 or with the amount of the data so as to accordingly supply a control signal to the switch 24 for selecting a recording medium.

Figure 6:
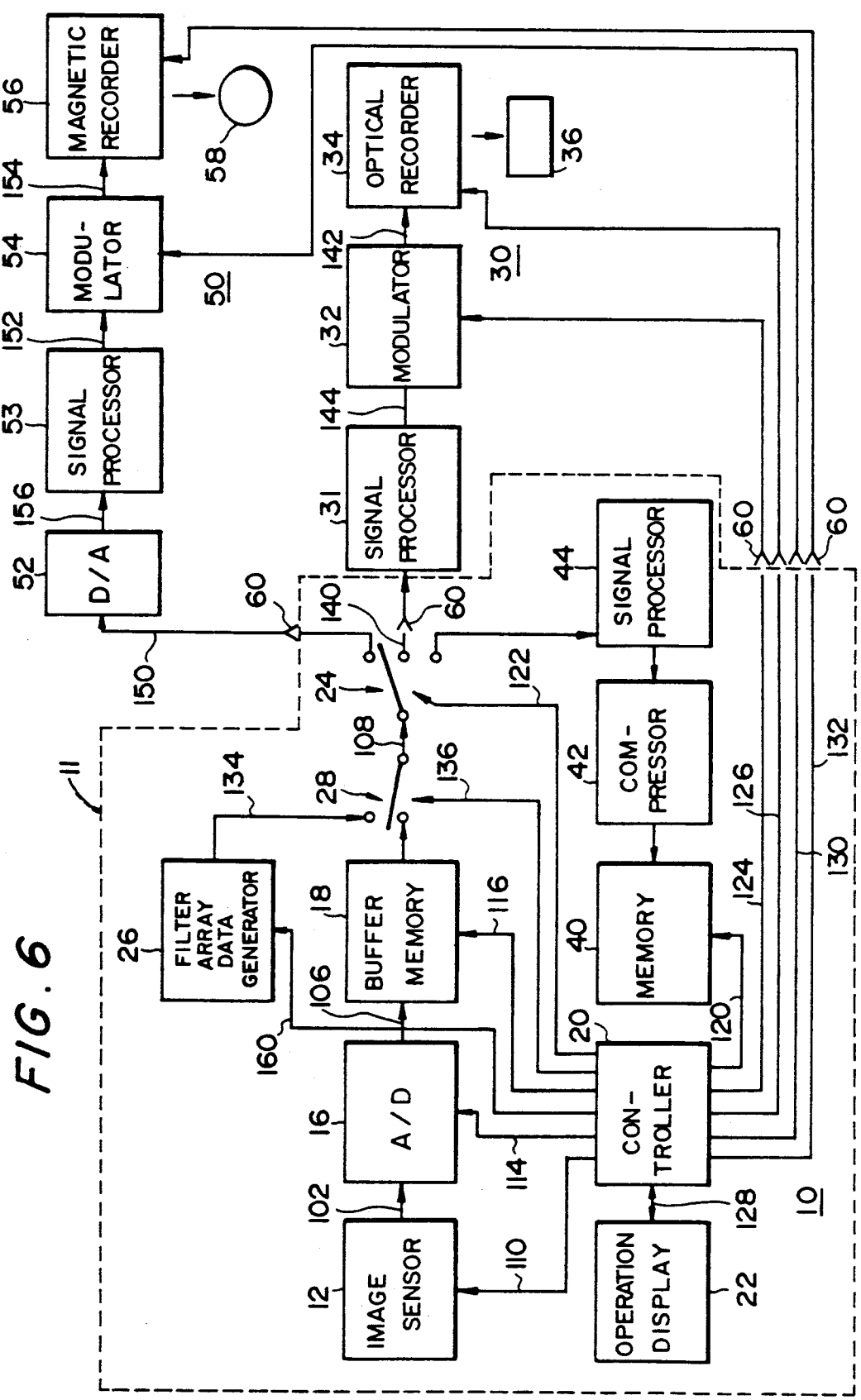

FIG. 6 illustrates an alternative embodiment of an electronic still camera according to the present invention.

In the configuration of this figure, as compared with the camera 10 of FIG. 1, the signal processor 14 is omitted and the output 102 from the image sensor 12 is directly inputted to the AD converter 16. In consequence, because the signal processor 14 is omitted, the output 102 associated with the filter array of the image sensor 12, namely, the signal which has not undergone the color separation, is supplied to the AD converter 16 so as to be delivered via the buffer memory 18 to the switch 28.

In this apparatus, there is disposed a filter array data generator 26 for producing data associated with a filter array of the image sensor 12. The filter array data generator 26 delivers an output 134 to the switch 28. The switch 28 is changed over in response to a control signal sent from the controller 20 via the control line 136 such that the image data from the buffer memory 18 and the filter array data from the filter array data generator 26 are alternately fed to the switch 24.

The switch 24 is changed over, like the system of FIG. 1, for the selection of a recording medium.

In addition, in this apparatus, the DA converter 52 of the magnetic recording unit 50 delivers the output 156 to the signal processor 53. The signal processor 53 effects a sample and hold operation on image data received from the DA converter 52 based on the filter array data received from the filter array data generator 26 so as to develop a color component signal generate function in which the image data undergoes a color separation for producing color component signals R, G, and B and to develop a matrix function in which the color component signals R, G, and B are processed to generate a luminance signal Y and color difference signals R-Y and B-Y. Furthermore, the signal processor 53 effects necessary video signal processing such as a white balance adjustment and a gradation correction on the attained signals. The signal processor 53 delivers the output 152 to the modulator 54.

Also the optical recording unit 30 includes a signal processor 31 before the modulator 32. Like the signal processor 53, the signal processor 31 effects a sample and hold operation, by the filter array data received from the filter array data generator 26, on the image data received via the connector 60 so as to achieve a color separation thereon to produce color component signals R, G, and B. The signal processor 31 further effects necessary video signal processing such as a white balance adjustment and a gradation correction on the attained signals. The signal processor 31 delivers the output, which is modulated by the modulator 32.

In the similar fashion, a signal processor 44 is disposed between the switch 24 and the compressor 42.

According to this embodiment, the image data associated with the filter array of the image sensor 12 is directly accumulated in the buffer memory 18 so as to be supplied via the switch 24 to the memory 40, the magnetic disk 58, or the optical card 36. On the other hand, the filter array data produced from the filter array data generator 26 is similarly supplied thereto and hence the image data is converted, before the recording operation thereof on the recording media, into the color component signals R, G, and B or the luminance signal Y and color difference signals R-Y and B-Y, namely, the image data is recorded in the form of the signals R, G, B or the signals Y, R-Y, and B-Y.

Figure 7:
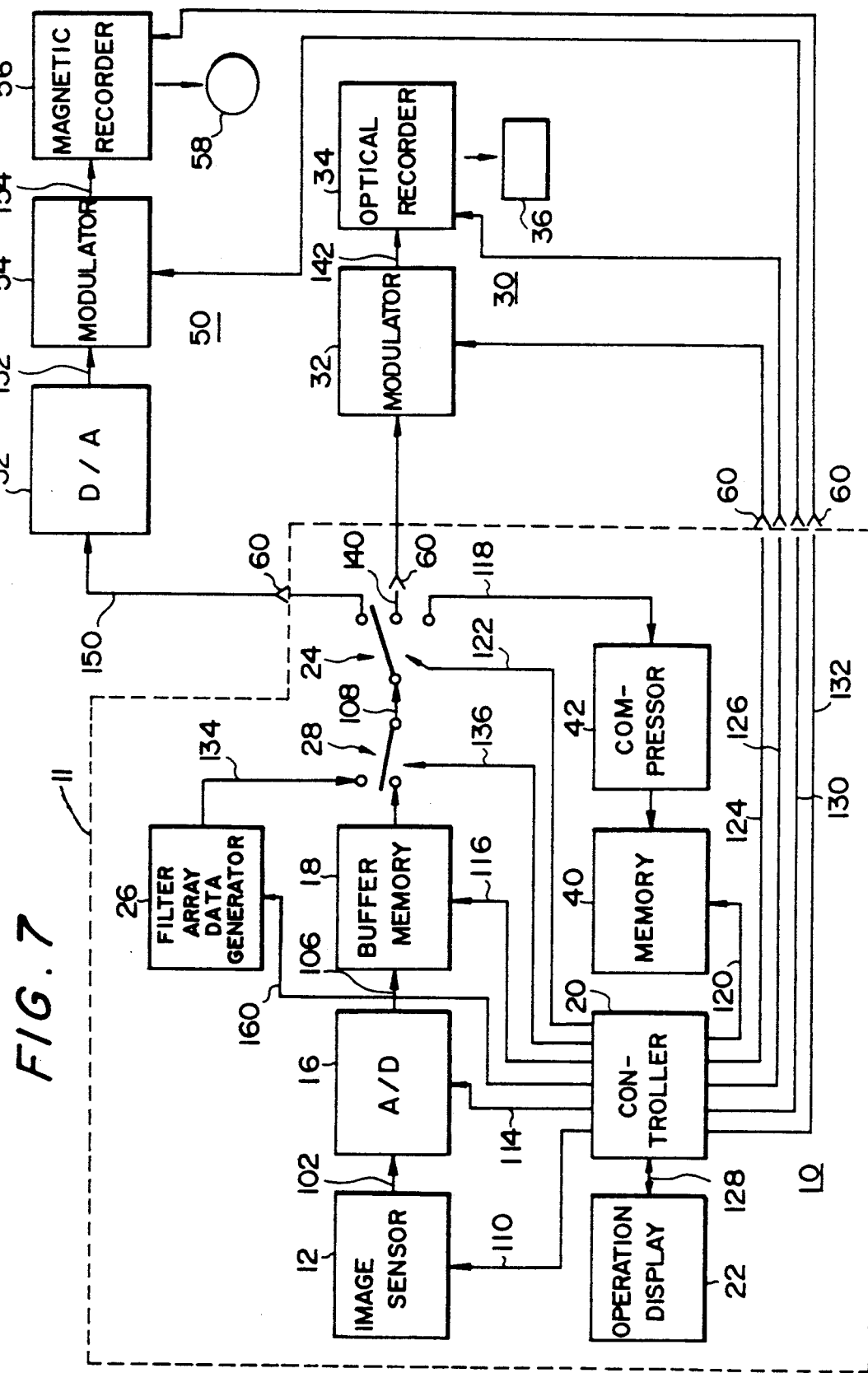

FIG. 7 illustrates still an alternative embodiment of an electronic still camera according to the present invention.

In the configuration of this figure, as compared with the apparatus of FIG. 6, the signal processors 53, 31, and 44 are omitted. In this system, image data associated with the filter array of the image sensor 12 is directly written in the memory 40, the magnetic disk 58, or the optical card 36. Furthermore, the filter array data produced from the filter array data generator 26 is recorded on these recording media. In consequence, since the filter array data is written in the recording media together with the image data, when an image recorded thereon is reproduced by a playback apparatus, it is possible by the filter array data to produce the signals R, G, and B or the signals Y, R-Y and B-Y.

Figure 8:
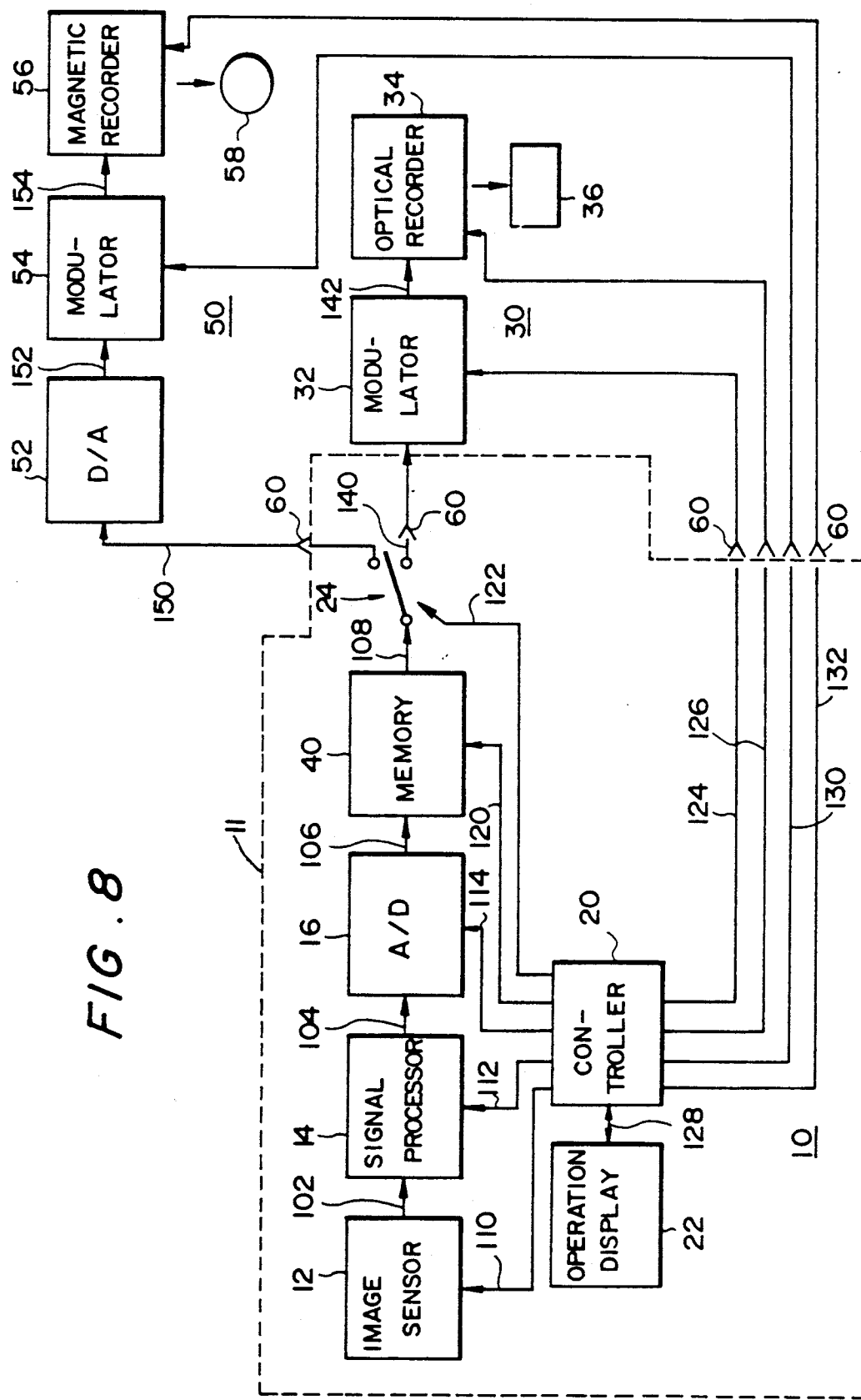

FIG. 8 illustrates still an alternative embodiment of an electronic still camera according to the present invention.

In the configuration of this figure, the AD converter 16 delivers the output 106 to the input of the semiconductor memory 40, which receives all image signals supplied from the AD converter 16 for a temporary storage thereof. The memory 40 delivers the output 140 to the modulator 32 of the optical recording unit 30 or the DA converter 52 of the magnetic recording unit 50, the recording units 30 and 50 being connected via the connector 60 to the electronic still camera 10.

In this embodiment, also in a case where the magnetic recording unit 50 or the optical recording unit 30 is linked to the camera 10, all images shot by the camera 10 are inputted via the AD converter 18 to the memory 40 for a temporary storage thereof. Later, in response to a control signal sent from the controller 20 via the signal line 120, the image signal to be recorded on the magnetic disk 58 or the optical card 36 is read from the memory 40 so as to be supplied via the connector 60 to the DA converter 52 or the modulator 32 and then to be written on the magnetic disk 58 or the optical card 36 in the same way as described above.

According to this embodiment, like in the case of FIG. 1, the operator can select either one of the semiconductor memory 40, the magnetic disk 58, and the optical card 36 to record still pictures thereon. In consequence, since the recording medium can be selected depending on the recording capacity and the recording speed, the recording operation is conducted according to the shooting conditions. Furthermore, in a case where neither the magnetic disk 58 nor the optical card 36 is employed for the recording operation, it is possible to remove the magnetic recording unit 50 and the optical recording unit 30 so as to reduce the weight of the overall system of the camera 10.

FIG. 9 illustrates further an alternative embodiment of an electronic still camera according to the present invention.

In the configuration of this figure, the optical recording unit 30 including the modulator 32 and the optical recorder 34 is housed in the electronic still camera 10 such that the memory 40 is detachably linked to the camera 10 via the connector 60. In consequence, the optical card 36 is installed in the optical recorder 34 of the camera 10 such that an obtained still picture is recorded on the optical card 36. Moreover, when the attained image signal is to be stored in the memory 40, the memory 40 is connected to the camera 10 such that the image signal produced by the camera 10 is supplied via the connector 60 to the memory 40.

In the apparatus of this configuration, in a case where the memory 40 is employed together with the optical card 36 as the recording medium to record the obtained picture, the operator connects the memory 40 via the connector 60 to the electronic still camera 10.

When the operator initiates the operation display 22 to shoot an object field, the image sensor 12 delivers a video signal, which is supplied via the signal procesor 14 and the AD converter 16 to the frame memory 18. An indication is made by the operator to select either one of the optical card 36 and the memory 40 as the recording medium. For example, when a large amount of images are to be shot at a low speed, the optical card 36 is selected. As a result, the controller 20 sends a control signal via the control line 122 to the switch circuit 24, which in turn is connected in the state opposite to that illustrated in this figure such that the image signal outputted from the frame memory 18 is sent via the switch 24 and the signal line 140 to the modulator 32. The modulator 32 then supplies a modulated signal via the signal line 142 to the optical recorder 34, which in turn produces a laser light to effect an optical recording on the optical card 36.

On the other hand, in a case where a high-speed shooting operation is achieved or where a small number of pictures are to be shot, an indication to select the memory 40 is supplied from the operation display 22 so as to connect the switch circuit 24 in the state of FIG. 9. As a result, the image signal delivered from the frame memory 18 is passed via the switch 24, the connector 60, and the signal line 118 to the memory 40 so as to be stored therein.

Also in the case of this embodiment, it is possible to select as the recording medium either one of the semiconductor memory 40 and the optical card 36. In consequence, an appropriate recording medium can be selected depending on the shooting speed and the amount of pictures to be recorded.

In addition, when the semiconductor memory 40 is not used, it is possible to remove the memory 40 from the camera 10 to minimize the weight of the overall system of the camera 10. Incidentally, in the apparatus of this embodiment, although not shown, the magnetic recording unit 50 may be connected thereto by the connector 60 if necessary. Alternatively, the magnetic recording unit 50 may be disposed in the camera 10.

FIG. 10 illustrates still an alternative embodiment of the electronic still camera according to the present invention.

In the configuration of FIG. 10, a memory 40, a magnetic recorder 50 and an optical recorder 30 are housed in the camera 10. In consequence, this configuration is different from that of the camera 10 of FIG. 1 in that a magnetic recording unit 50 and an optical recording unit 30 are connected thereto without employing the connector 60. The other configurations are the same as those of the camera 10 of FIG. 1 and hence will not described.

Also in the camera 10 of this embodiment, through a change-over operation of a switch circuit 24, an output from a frame memory 18 is fed to either one of the memory 40 and the magnetic recording unit 50, the optical recording unit 30. In consequence, it is possible to select as the recording medium either one of the memory 40, the magnetic recording unit 50, and the optical recording unit 30. An appropriate recording operation can be accordingly conducted depending on conditions such as the shooting speed and the number of pictures to be shot.

According to the present invention, because the semiconductor store device, the optical recording device, or the magnetic recording device can be selected as the recording medium, an appropriate recording operation can be therefore conducted depending on conditions such as the shooting speed and the volume of images to be shot.

While the present invention has been described with reference to the particular illustrative embodiments, it is not restricted by those embodiments but only by the appended claims. It is to be understood that those skilled in the art can change or modify the embodiments without departing from the scope and spirit of the present invention.

What is claimed is:

1. An electronic still camera for shooting an object field to record a still picture representative of the object field in a recording medium, comprising:

imaging means for shooting the object field to produce a video signal representative of the object field;

analog-to-digital signal converter means for converting said video signal produced from said imaging means into a digital signal corresponding to said video signal;

storage means for temporarily storing said digital signal produced from said analog-to-digital signal converter means, said storage means being operative at a plurality of readout speeds;

digital-to-analog signal converter means for converting said digital signal produced from said storage means into an analog signal corresponding to said digital signal;

first recording means for recording said analog signal developed from said digital-to-analog signal converter means in an analog, magnetic recording medium at a first recording rate;

second recording means for recording said digital signal read out from said storage means in a digital, optical recording medium at a second recording rate lower than said first recording rate, at least one of said magnetic recording medium and said optical recording medium being detachably connectable to a corresponding one of said first and second recording means;

selector means for delivering said digital signal read out from said storage means selectively to either one of said digital-to-analog signal converter means and said second recording means; and control means for controlling said imaging means, said analog-to-digital signal converter means, said storage means, said first and second recording means and said selector means to read out said digital signal from said storage means to selectively supply said digital signal to either one of said first and second means at any of said first and second recording rate.

2. An electronic still camera in accordance with claim 1 further comprising:

signal processing means for processing said video signal produced in response to a shooting operation of said imaging means and associated with a filter array of said imaging means and for generating color component signals;

said selector means delivering to the selected recording medium said color component signals processed by said signal processing means.

3. An electronic still camera in accordance with claim 2 further comprising:

matrix means for converting into a luminance signal and color difference signals said color component signals processed by said signal processing means;

said selector means delivering to the selected recording medium said luminance signal and said color difference signals converted by said matrix means.

4. An electronic still camera in accordance with claim 1 further comprising:

filter array data output means for delivering data of a filter array of said imaging means:

said selector means supplying the selected recording medium with the data of said filter array fed from said filter array data output means together with said video signal read from said storage means.

5. A electronic still camera in accordance with claim 1, further comprising:

signal compressing means for compressing said digital signal read out from said storage means to produce a resultant signal; and third recording means for recording said resultant signal produced from said signal compressing means in a semiconductor storage medium at a third recording rate lower than said first recording rate and higher than said second recording rate;

said selector means being operative in response to said control means to deliver said digital signal read out from storage means selectively to said third recording means.

6. An electronic still camera in accordance with claim 5, wherein said semiconductor recording medium is detachably connectable to said third recording means.

7. An electronic still camera for shooting an object field to record a still picture representative of the object field in a recording medium, comprising:

imaging means for shooting the object field to produce a video signal representative of the object field;

analog-to-digital signal converter means for converting said video signal produced from said imaging means into a digital signal corresponding to said video signal;

storage means for temporarily storing said digital signal produced from said analog-to-digital signal converter means, said storage means being operative at a plurality of readout speeds;

digital-to-analog signal converter means for converting said digital signal produced from said storage means into an analog signal corresponding to said digital signal;

first recording means for recording said analog signal developed from said digital-to-analog signal converter means in an analog, magnetic recording medium at a first recording rate;

signal compressing means for compressing said digital signal read out from said storage means to produce a resultant signal;

third recording means for recording said resultant signal produced from said signal compressing means in a semiconductor storage medium at a third recording rate lower than said first recording rate;

second recording means for recording said digital signal read out from said storage means in an optical storage medium at a second recording rate lower than said first recording rate and said third recording rate, at least one of said magnetic recording medium and said semiconductor storage medium being detachably connectable to a corresponding one of said first and second recording means;

selector means for delivering said digital signal read out from said storage means selectively to either one of said digital-to-analog signal converter means, and said second recording means said signal compressing means; and control means for controlling said imaging means, said analog-to-digital signal converter means, said storage means, said first and, second, and third recording means said selector means to read out said digital signal from said storage means to selectively supply said digital signal to either one of said first, second, and third recording means to any of said first, second, and third recording rates.

8. An electronic still camera for shooting an object field to record a still picture representative of the object field in a recording medium, comprising:

- imaging means for shooting the object field to produce a video signal representative of the object field;
- analog-to-digital signal converter means for converting said video signal produced from said imaging means into a digital signal corresponding to said video signal;
- storage means for temporarily storing said digital signal produced from said analog-to-digital signal converter means, said storage means being operative at a plurality of readout speeds;
- signal compressing means for compressing said digital signal read out from said storage means to produce a resultant signal;
- first recording means for recording said resultant signal produced from said signal compressing means in a semiconductor storage medium at a first recording rate;
- second recording means for recording said digital signal read out from said storage means in a digital, optical recording medium at a second recording rate lower than said first recording rate, at least one of said optical recording medium and said semiconductor storage medium being detachably connectable to a corresponding one of said first and second recording means;
- selector means for delivering said digital signal read out from said storage means selectively to either one of said signal compressing means and said second recording means; and
- control means for controlling said imaging means, said analog-to-digital converter means, said storage means, said first and second recording means and said selector means to read out said digital signal from said storage means to selectively supply said digital signal to either one of said first and second recording means at any of said first and second recording rates.

* * * * *